Patented Nov. 20, 1951

2,575,344

UNITED STATES PATENT OFFICE 2,575,344

DIHYDROXYPROPYL THEOPHYLLINE

James W. Jones and Paul V. Maney, Iowa City, Iowa, assignors to the State of Iowa, for the use and benefit of the State University of Iowa, Iowa City, Iowa, an educational institution of Iowa No Drawing. Application March 1, 1946, Serial No. 651,420

5 Claims. (Cl. 260—256)

The invention relates to a novel derivative of theophylline (1.3 dimethyl xanthine) which is useful as a medicine where theophylline is indicated but avoids the objectionable effects of the latter.

It is an object of the invention to provide a derivative of theophylline, namely dihydroxypropyl theophylline, which is very soluble in water and which is not precipitated by digestive juices.

It is a further object of the invention to provide the named derivative of theophylline usable in medicine to replace theophylline ethylene diamine, and theophylline with sodium acetate while avoiding the nauseating effects of the latter, and from which theophylline will not be precipitated by digestive juices.

It is a further object of the invention to provide a theophylline derivative useful in medicine which avoids the excessive alkalinity of theophylline compounds now known for like use.

It is a further object of the invention to provide the named derivative of theophylline useful as a diuretic and for myocardiac stimulation that may be applied by mouth, while avoiding nauseating effect.

It is a further object of the invention to provide a process of preparing dihydroxypropyl theophylline.

The medical application of theophylline combinations is described in New and Nonofficial Remedies for 1945, published by American Medical Association, Chicago, Ill., pages 387, 388.

The presently available theophylline compounds or combinations are undesirable for the following reasons:

1. Theophylline is very insoluble in water.
2. The presently used compounds are incompatible with the digestive juices which causes theophylline to be precipitated.
3. The theophylline compounds or combinations produce distinctly alkaline solutions.
4. The administration of theophylline or the known compounds or combinations of theophylline with ethylenediamine or sodium acetate often produces nausea.

In accordance with the present invention 180 grams of theophylline is dissolved in 500 c. c. of boiling water. To this solution is added 40 grams of sodium hydroxide or 56 grams of potassium hydroxide slowly and with constant stirring.

When solution is complete, 120 grams of 1-chloro-2,3 dihydroxypropane is slowly added. The thus provided mixture is brought to boiling and heating is continued until a temperature of 110° C. is reached.

The resultant liquid is evaporated under reduced pressure to remove all traces of water. The resulting syrupy liquid is allowed to stand with occasional stirring until crystallization takes place.

The compound is purified by recrystallization from alcohol. The compound melts at 155–157° C. and has the following structure.

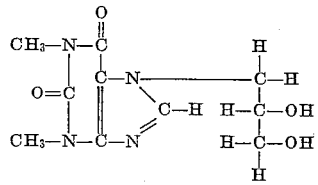

One gram of dihydroxypropyl theophylline is soluble in 3 cc. of water at 25° C. A one percent water solution of the material has a pH value of 7.3.

Clinical tests involving over one thousand doses show that the material of the invention retains the therapeutic activity of theophylline; that it is compatible with digestive juices from which it is not precipitated; and that it produces no nausea when administered several times daily over a period of several weeks.

We claim:

1. Dihydroxypropyl theophylline.
2. The process of preparing dihydroxy-propyl theophylline which consists in first treating an aqueous solution of theophylline with a hydroxide chosen from the group which consists of sodium hydroxide and potassium hydroxide, transforming the thus produced alkali metal compound of theophylline to dihydroxypropyl theophylline by treatment with 1-chloro-2,3 dihydroxy propane at a temperature of substantially 110° C.
3. Dihydroxypropl theophylline having the formula:

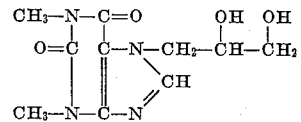

4. The process of preparing dihydroxypropyl theophylline which comprises alkylating an alkali metal salt of theophylline with 1-chloro-2,3 dihydroxy propane.
5. Process for obtaining 7-(1,2-propandiol-3) theophylline which comprises alkylating an alkali metal salt of theophylline with a 2,3-dihydroxypropyl halide.

JAMES W. JONES.
PAUL V. MANEY.

REFERENCES CITED

The following references are of record in the file of this patent:

FOREIGN PATENTS

| Number | Country | Date |
|--------|---------|------|
| 4,250 | Great Britain | 1907 |
| 569,463 | France | Apr. 12, 1924 |

OTHER REFERENCES

Jour. of Biological Chem., 92 (1931), 53–57.